(12) United States Patent
Bramberger

(10) Patent No.: US 11,340,598 B2
(45) Date of Patent: May 24, 2022

(54) METHOD AND APPARATUS FOR PROVIDING A WORKPIECE REPRESENTATION AT A PRODUCTION STATION

(71) Applicant: LIEBHERR-WERK BIBERACH GMBH, Biberach an der Riss (DE)

(72) Inventor: Robert Bramberger, Mittelstetten/Vogach (DE)

(73) Assignee: LIEBHERR-WERK BIBERACH GMBH, Biberach an der Riss (DE)

( * ) Notice: Subject to any disclaimer, the term of this patent is extended or adjusted under 35 U.S.C. 154(b) by 69 days.

(21) Appl. No.: 16/762,216

(22) PCT Filed: Nov. 8, 2018

(86) PCT No.: PCT/EP2018/080639
§ 371 (c)(1),
(2) Date: May 7, 2020

(87) PCT Pub. No.: WO2019/092117
PCT Pub. Date: May 16, 2019

(65) Prior Publication Data
US 2020/0348658 A1 Nov. 5, 2020

(30) Foreign Application Priority Data

Nov. 10, 2017 (DE) ..................... 10 2017 126 389.6

(51) Int. Cl.
*G05B 19/418* (2006.01)
*G06F 16/903* (2019.01)
*G06T 17/10* (2006.01)

(52) U.S. Cl.
CPC ... *G05B 19/41885* (2013.01); *G05B 19/4183* (2013.01); *G05B 19/4188* (2013.01); *G06F 16/90335* (2019.01); *G06T 17/10* (2013.01)

(58) Field of Classification Search
None
See application file for complete search history.

(56) References Cited

U.S. PATENT DOCUMENTS

| 2010/0302242 | A1 | 12/2010 | Buchanan et al. |
| 2016/0026174 | A1 | 1/2016 | Eitzenberger et al. |
| 2016/0171360 | A1 | 6/2016 | Rettich |

FOREIGN PATENT DOCUMENTS

| CN | 101606156 A | 12/2009 |
| CN | 103890766 A | 6/2014 |

(Continued)

OTHER PUBLICATIONS

International Search Report and Written Opinion dated Jan. 4, 2019 corresponding to International Patent Application No. PCT/EP2018/080639, and partial English translation thereof.

(Continued)

*Primary Examiner* — Carlos R Ortiz Rodriguez
(74) *Attorney, Agent, or Firm* — Squire Patton Boggs (US) LLP

(57) ABSTRACT

A method and an apparatus provides a workpiece representation at a production station. A database is used to store a data record for providing an original model of the workpiece. A display unit at the production station displays the workpiece representation using stored model data. A first data record represents an original model of the workpiece, and stored in a database, a second data record, which is simplified in comparison with said first data record and for representing a simplified model of the workpiece, is generated and is stored A code is provided at the production station, and the terminal can use the code to retrieve the second data record and can use said second data record to display the simplified workpiece model. For outsiders, the transmitted code is unusable without a suitably configured (Continued)

Figure 3:
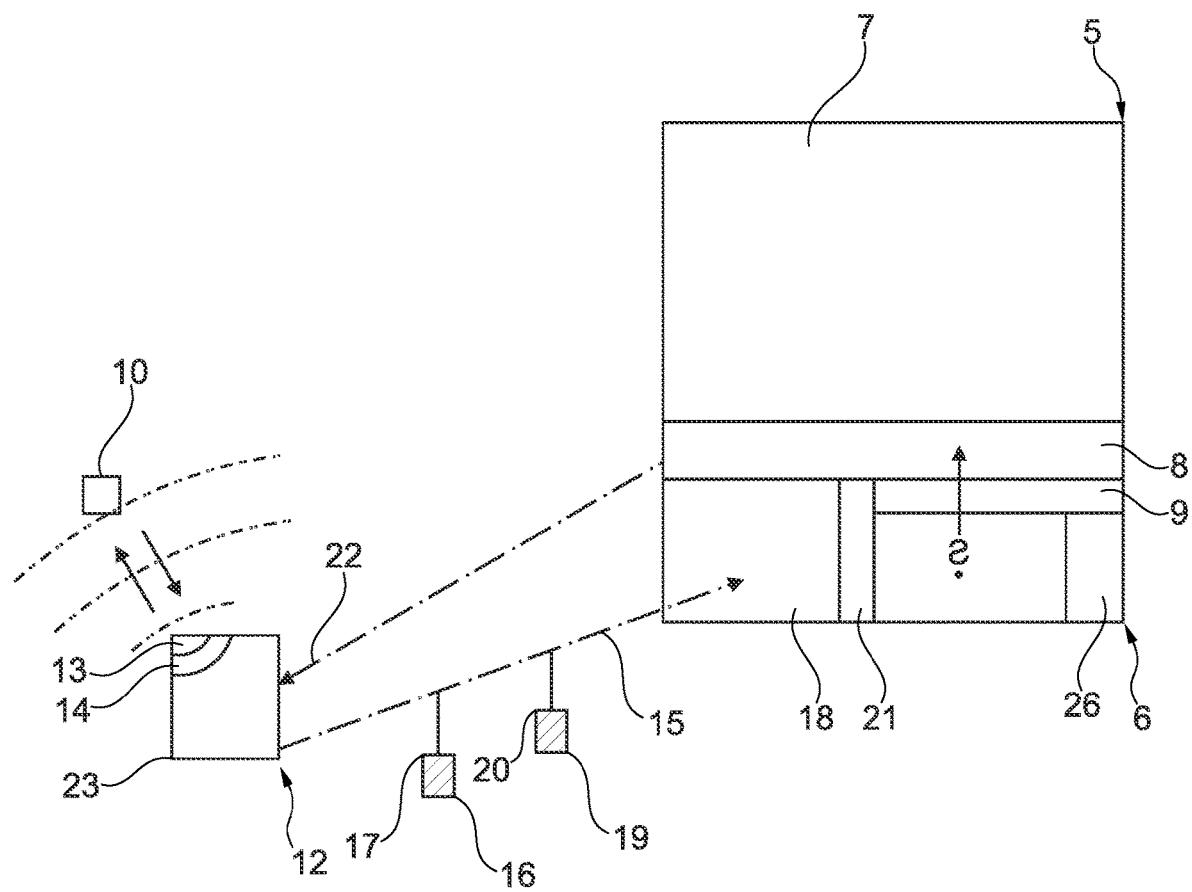

terminal and/or without a suitable user identifier. The terminal can be, for example, a mobile screen device or smartglasses.

22 Claims, 2 Drawing Sheets

(56) References Cited

FOREIGN PATENT DOCUMENTS

| | | |
|---|---|---|
| CN | 104699887 A | 6/2015 |
| CN | 106845919 A | 6/2017 |
| CN | 107292538 A | 10/2017 |
| DE | 10 2008 003 731 A1 | 8/2008 |
| DE | 10 2015 103 853 A1 | 9/2016 |
| EP | 0 425 408 A2 | 5/1991 |
| EP | 2 980 736 A1 | 2/2016 |
| WO | WO 2008/095574 A2 | 8/2008 |
| WO | WO 2015/025012 A1 | 2/2015 |

OTHER PUBLICATIONS

German Search Report dated Sep. 17, 2018 corresponding to German Patent Application No. 10 2017 126 389.6.
Werner Schreiber et al., "Virtuelle Techniken im industriellen Umfeld," Springer-Verlag Berlin Heidelberg, 2012, ISBN 978-3-642-20635-1, Seite 265 bis 271.
Chinese Office Action issued in corresponding Chinese Patent Application No. 201880085250.6 dated Jan. 12, 2022.

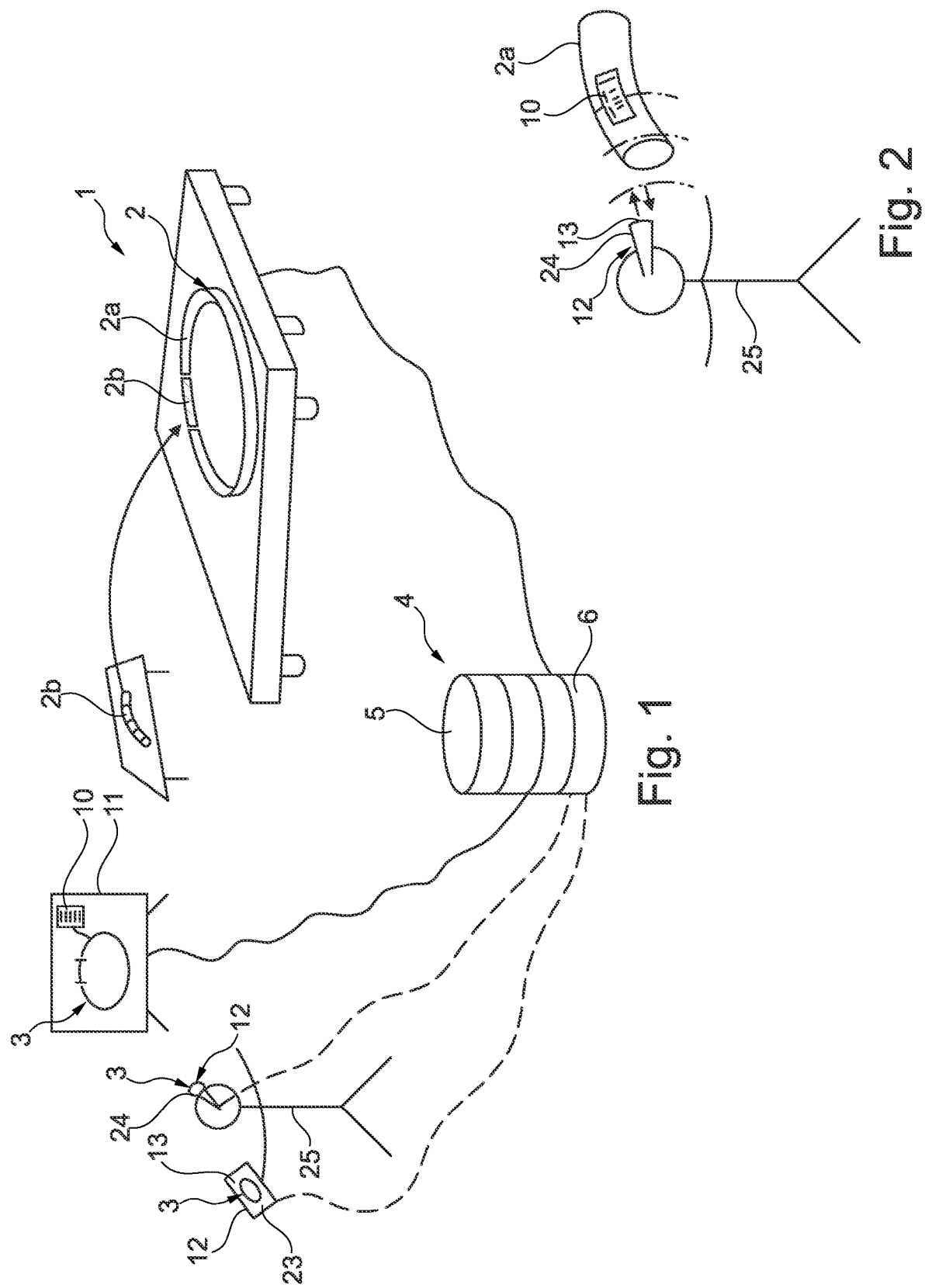

METHOD AND APPARATUS FOR PROVIDING A WORKPIECE REPRESENTATION AT A PRODUCTION STATION

The present invention relates to a method and to an apparatus for providing a workpiece representation at a production station, wherein a data set for providing an original model of the workpiece is stored in at least one database and the workpiece representation is displayed on a display unit of an end device at the production station with the aid of stored model data.

Workpiece representations required at production stations are still frequently used in production facilities, despite the increasing use of electronic data processing, in the form of paper drawings that are frequently printed and handed over to the machine operator on the preparation or release of the production job. To visualize the required information on the workpiece to be produced clearly and explicitly to the machine operator, such drawings are often printed in a very large size to be able to show different side views and sectional views sufficiently large. In this respect, a "workpiece" to be produced cannot only be a single part, but also an assembly comprising a plurality of single parts that may have to be joined together so that the workpiece representation becomes even more complex. Such production drawings on paper are here not only impractical in handling and also limited in clarity in large sizes, but are also difficult to keep under lock and key since they are frequently carelessly left at the production station.

It has therefore also already been suggested in the sense of a paperless factory to set up large-format screens at production stations on which production drawings can be displayed electronically. Such screens, for example in the form of LCD monitors, are used, for example, at NC controlled machining centers such as milling machines, lathes, or other cutting or non-cutting machine tools. However, with more complex workpieces, such a visualization is sometimes not sufficient to plastically illustrate the workpiece to the machine operator. This is the case, for example, when spatially demanding workpieces having contour cut, for example, in different planes have to be produced, for example a complex framework having weld seams in different contour planes.

Additional deficiencies can also result when different machine operators have access to a production station or when a workpiece has to be machined by a moving machine operator in a moving production line so that the workpiece representation on a fixedly installed screen is not always displayed suitably for the respective angle of view. Even if large-format screens are used, a continuous turning to and fro of the angle of view between the screen and the workpiece can be tiring.

At the same time, the problem arises with such electronic representations of the production drawings as to how a representation, that may not yet have been input, can be accessed or downloaded by an employee working at the respective production station. On the one hand, the respective employees are sometimes not familiar with the details of the IT system, even if they are highly qualified in the use of "their" machine tool and its computer control. On the other hand, the question of authorization also arises since a respectively required drawing should only be displayed to an employee authorized for it.

The display of image representations of a product to be produced on a machine operator screen is shown, for example by document EP 0 425 408 A2.

This approach toward a "paperless factory" has been refined in various details in further documents. DE 10 2015 103 853 A1, for example, shows the provision of 3D representations of cutting machine tools over a user portal. Document DE 10 2008 003 731 shows the storage of 3D models in a database and the provision of the 3D models together with auxiliary figures for a mechanic, with access to the database taking place via an intranet. Similar systems that display 3D models electronically to a machine operator are also known from the documents WO 2008/095574 A2 and EP 2 980 736 A1.

Document WO 2015/025012 A furthermore shows the provision of assembly instructions for machine tools on a screen, wherein such assembly instructions should also comprise multimedia files and 3D models of machine parts.

Starting from this, it is the underlying object of the present invention to provide an improved method and an improved apparatus for providing workpiece representations at a production station which avoid disadvantages of the prior art and further develop the latter in an advantageous manner. A clear visualization of the workpiece to be produced should in particular be provided in a simple manner to every authorized employee at every production station without the employee requiring in-depth IT knowledge for this purpose, without high data volumes having to be transmitted, or without data security having to be sacrificed.

In accordance with the invention, said object is achieved by a method in accordance with claim 1 and by an apparatus in accordance with claim 10. Preferred embodiments of the invention are the subject of the dependent claims.

It is therefore proposed to generate, in addition to a first data set that is configured for representing an original model of the workpiece on a CAD system, for example, and is stored in a database, a second data set that is simplified with respect to said first data set and is configured for representing a simplified model of the workpiece and to store it in said data base in which said first data set is stored or to store it in another database, wherein initially only a code for identifying the workpiece to be produced is provided at the production station, said code being able to be read at an end device so that said end device can retrieve the second, simplified data set from the data base using the code and can display the simplified workpiece model on a display unit using the second, simplified data set transmitted to the end device.

Not only the data volumes to be transmitted and the processing power required at the end device, and optionally also a complex CAD software model at the end device for a representation can be saved by the generation and use of a "pared down" workpiece model, but information and views unnecessary for the machine operator can also be omitted to increase the clarity of the workpiece representation at the production station. At the same time, the handling for the respective machine operator at the production station remains simple since only the transmitted code has to be read or entered at the end device, whereupon the end device preferably automatically or semiautomatically initiates the transmission of the model data for displaying the workpiece model at the display unit of the end device so that a respective machine operator does not have to have any in-depth IT knowledge to be able to display the workpiece representation. Despite such a simple handling, an uncontrolled branching of or diversion of the workpiece data can be avoided since the end device at which the code is read or entered has to be configured, for example in the form of a correspondingly formed and imported software module to communicate with the correct database or with a serve connected thereto in the required predetermined manner using the code read in. The transmitted code is worthless per se for outsiders since the code cannot be used further without a suitably configured end device and/or without a matching user ID.

In an advantageous further development of the invention, the second, simplified data set can have a standardized data format that is compatible with various end devices and that permits the simplified workpiece model also to be displayed at the end device without the presence of a CAD program. For example, the simplified data set can be configured in the form of a STEP-file that can be displayed at the end device by a standard app implemented there in the form of a STEP viewer or STP viewer. Unlike the simplified second data set that is transmitted to the end device, the first data set for representing the original model can have a different data format, in particular in the form of a CAD file that can be used with an associated CAD program.

Said second, simplified data set for representing a three-dimensional workpiece model can in particular be configured to also be able to display a plastic, clear workpiece representation in the form of a 3D model at the end device at the production station. The visualization software implemented at the end device for this purpose is advantageously configured to be able to rotate or flip the view or direction of gaze of the 3D model, in particular to be able to tilt it by a plurality of spatial axes to be able to provide the desired view to the machine operator.

The more comprehensive first data set in a different format and the simplified, second data set can advantageously be stored together in a database, with the two data sets being able to linked to one another and/or stored in an interlaced manner. The simplified, second data set can, for example, be stored as an attachment to the first, more complex data set. Alternatively or additionally, the second reduced data set can be stored in the database as a part of the first, more complex data set.

Alternatively, however, it is generally also possible to store said first and second data sets in different databases.

The generation of the second, simplified data set can generally take place in different manners here. In accordance with a first embodiment, the generation of the second, simplified data set can be integrated in the preparation of the first data set, in particular in an automated manner on the entering of the workpiece and/or on the preparation of the original model of the workpiece. The simplified data set can in particular be derived in an automated manner on the preparation of the CAD drawing of the workpieces from the CAD data generated in so doing.

Alternatively it is, however, likewise possible in accordance with another embodiment to prepare the model data of the second data set externally and not to use the CAD program for the preparation of the original model for this purpose, but rather an external software tool. Such an externally prepared second data set can nevertheless be stored in common together with the first more complex data set in one data base, for example in the aforesaid manner as an attachment to the first data set.

To be able to better control access to the workpiece data, the code transmitted to the production station is decoded by means of a decoding device at the end device in a further development of the invention, and a model identification is generated from the code that is transmitted by the end device to the database and/or to a server connected to said database to retrieve the workpiece model data, whereupon the database or said server can provide the second data set belonging to the respective workpiece while processing the model identification. It is therefore advantageously not the code read in or entered at the end device that is directly transmitted to the database, but a digitally processable model ID that is generated from the read in or entered code and that can then be further processed by the database or by the server connected thereto. It can hereby be prevented that the database can be accessed simply using the code by means of general end devices not accordingly configured.

Only when the end device has the corresponding decoding device or has access thereto can the end device make use of the code and query the required model data using the decoded model ID. It would, however, nevertheless be possible in an alternative development of the invention to also effect the querying of the second data set directly using the read in code is a lower security level is sufficient.

The decoding device that can, for example, be implemented directly at the end device in the form of a decoding software module can in particular not only decode the model ID in the named manner, but can also acquire information on the database to be queried or on the server to be queried from the read in or entered code. Said decoding device can in particular be configured to decode a network address, for example in the form of a server ID or a database ID, from the transmitted code and the end device can then direct the query of the model data using said network address to the "correct" database or to the "correct" server.

Instead of a decoding software module implemented directly at the end device or in addition hereto, the end device can also be configured to communicate with an external decoding device to decode the entered or read in code in the named manner.

To further increase data security, the end device can transmit the decoded model ID together with an end device and/or user identification to the database and/or to the server connected thereto, with the authorization of the querying end device and/or querying user to query the desired model data being checked by an authentication device, that can be connected to the database and/or to the server, using the transmitted model ID and the transmitted device and/or user ID. The model data can then be transmitted to or actually not transmitted to the end device in dependence on said authorization check.

Said end device identification can here be a code identifying the end device per se, while said user ID can, for example, be a password of a specific machine operator. A check of whether the querying end device and/or the user using the end device is/are actually authorized can be made by checking sad end device and/or user ID before transmitting the workpiece data to the end device.

Said authentication device can for this purpose, for example, store a preconfigured list of authorized end user IDs and/or authorized user IDs to compare the transmitted end device ID and/or user ID with the stored list on a query. To further increase security in this process, said authentication device can also work with an encoding and/or decoding device that decodes or encodes the transmitted and/or stored end device ID and/or user ID on or before the comparison. Such an encoding and/or decoding device can, for example, have a hash module for providing a cryptographic hash function, with such a hash module advantageously being configured to work in dependence on a key and being able to have a key generation module for generating a key for the cryptographic has function.

Said code that is transmitted to the production station can, for example, be a QR code, i.e. a quick response code such as was developed in the form of a two-dimensional code by the Japanese company Denso Wave in the 1990s. Alternatively or additionally, however, other codes can also be used, for example in the form of a barcode or of a numerical and/or letter code.

Depending on the configuration of the code, the end device can have differently configured code reading units, for example a visual code detection unit such as a QR code reader or a barcode reader. Alternatively or additionally, the end device can have input means, for example in the form of a touchscreen for entering a numerical and/or letter code.

The end device and/or its display unit can advantageously be configured as a mobile screen device that can be held in the hand by a machine operator. The end device can, for example, be configured in the form of a tablet computer. Alternatively or additionally, the end device can comprise a cellular telephone having a sufficiently large screen on which the workpiece representation can be displayed in the described manner.

Alternatively or additionally, the end device can also comprise a plurality of separate components, with said separate components preferably being able to communicate wirelessly with one another. For example, the end device can have a separate input and/or reading apparatus for entering or reading the code, for example in the form of a code reading head that can be configured as portable. In addition to such a separate input or reading apparatus, the end device can have said display unit that the machine operator can take along with him separately or that can also be fixedly installed at the production station.

The end device can advantageously also comprise a plurality of display units, for example a portable display unit, preferably in the form of a tablet computer, and a fixedly installable display unit, for example in the form of a large-format screen.

Alternatively or additionally, the end device can also comprise a display unit which can be worn on the body as intended, for example in the form of data glasses on which the workpiece representation can be displayed in the sense of augmented reality so that the machine operator can see the workpiece actually to be produced or its components, on the one hand, and in parallel, on the other hand, the displayed workpiece model. Alternatively or additionally to such data glasses, a display unit wearable on the body can also be fastened to a piece of clothing of the machine operator, for example to the material of a sleeve. Alternatively or additionally, a display unit fastenable to the wrist by a strap in the sense of a smartwatch having a sufficiently large screen can also be used.

The previously named code, by whose input or reading in the workpiece representation can be generated on the display unit, of the end device can here be provided to the machine operator or to the production station in various forms. Said code can, for example, be printed on the job documents of a production job and can be physically handed over to the machine operator.

Alternatively or additionally, the code can also be attached to a workpiece to be processed that is delivered to the production station, for example in the form of a code sticker affixed to the workpiece or to its packaging or in the form of and electronic and/or magnetic code tag such as an RFID tag or a RuBee tag. Such a code associated with the workpiece allows the machine operator not only to identify the workpiece per se in a simple manner, but also provides him with the machining and/or installation information in the form of the workpiece representation. If, for example, a strut of a lattice to be prepared is delivered to a welding station, the associated workpiece representation can be retrieved by reading in the code affixed thereto and the welder can then weld the strut at the matching position of the lattice in the intended alignment using said code.

Alternatively or additionally, it would also be possible to transmit the code to the production station in electronic form, for example to display it on a fixedly installed screen there, so that it can be entered or read in at the mobile end device of the machine operator.

The invention will be explained in more detail in the following with reference to a preferred embodiment and to associated drawings. There are shown in the drawings:

FIG. 1: a schematic representation of a production station for producing a workpiece and of an apparatus for providing a workpiece representation at this production station that comprises a plurality of display units in the form of a screen installed at the production station, wearable display or screen glasses, and a portable tablet computer on which the workpiece representation can be displayed;

FIG. 2: a schematic representation of the scanning of a code affixed to the workpiece to be processed via the code reading device of the previously named data glasses; and FIG. 3: a schematic representation of the data structure of the server of the apparatus and of the data transmission between the server and the end device.

As FIG. 1 shows, a production station 1 can be an assembly station having a welding device to join and weld together a workpiece 2 composed of different workpiece parts 2a and 2b. In the example shown, an annular component is joined in this process. It is, however, understood that the production station 1 can also comprise different machine tools for a cutting or non-cutting production of workpieces, for example milling machines, lathes, or other machining centers.

To be able to provide workpiece representations 3 in the sense of production drawings at the production station 1, the apparatus 4 provided for this purpose comprises a database 5 that can be part of a server 6 of the production facility or that can be connected to such a server 6.

As FIG. 3 shows, data sets 7 on the workpieces to be produced can be stored in the database 5 of the server 6, with such a data set 7 in particular being able to be a CAD data set that was prepared by a CAD system on the designing of the workpiece and can serve to represent an original model, in particular a 3D CAD model, of the workpiece.

In addition to such a complete, more comprehensive data set 7, a second, reduced data set 8 that serves the representation of a simplified, but preferably still three-dimensional, model of the workpiece 2 can be stored in the server 6 or in its database 5, with said second, reduced data set 8 being able to have a reduced data volume and/or a different data format in comparison with the complete CAD data set 7.

As already initially described, such a second, reduced data set 8 can be generated, for example derived from the CAD data, in an automated manner on the preparation of the complete first data set 7, for example in that data not required for the production per se are omitted. Alternatively, such a second, simplified data set 8 can, however, also be generated separately from the CAD data using an external tool and can subsequently be saved added to the complete data set 7, for example as an attachment to the first data set 7, cf. FIG. 3. A saving of the second, simplified data set 8 as part of or as an attachment to the first data set 7 is generally possible independently of the generation of the second data set.

To control access to the model data stored in the database 5, the apparatus 4 further comprises a code generator 9 that generates a code 10 for a respective workpiece 2 or for the associated data set 8, said code 10 being able to be linked with the data set 8 in the database 5 or also being able to be stored in a separate storage device directly as such or also in encoded form.

Said code generator 9 can in particular generate a so-called QR code as the code 10 that can include the workpiece ID and optionally also the storage location of the associated data set 8 as the information.

Said code 10 is transmitted from the apparatus 4 to the production station 1 and/or to a machine operator assigned the production of the workpiece 2, for example in that said QR code is printed onto the job documents. Alternatively or additionally, said code 10 can, however, also be transmitted to the production station 1 electronically and can there be displayed on an installed screen or on another display apparatus 11, cf. FIG. 1. Alternatively or additionally, the code 10 can also be affixed to a workpiece 2 or to a component of the workpiece 2a to be produced, for example in the form of a code sticker or—depending on the code—by means of a data memory attached to the workpiece, for example in the form of an RFID tag or of a so-called RuBee tag.

To be able to enter or read the code 10 belonging to a workpiece 2 or to its representation, an end device 12 that can advantageously be an electronic data processing unit having a process and an internal memory and, optionally, further data processing modules known per se can have an input and/or read in apparatus 13, for example in the form of an image sensor that can read and process said QR code.

Said end device 12 can in particular comprise a decoding device 14 by means of which the entered or read in code 10 can be decoded to acquire a workpiece or model ID and optionally also a database ID from it. The end device 12 can make a query at the server 6 or the "correct" database 5 by means of said model ID and said database ID to read out or query the data belonging to said model ID there.

As FIG. 3 shows, the query 15 of the end device 12 to the server 6, which query 15 can include said model ID 16 and database ID 17, can, for example, be transmitted to an authentication device 18 of the server 6 wirelessly via an intranet or another communication link that checks the authorization of the query or of the querying party. For this purpose, said query 15 can advantageously also include an end device ID 19 and/or a user ID in the form of a password 20 with reference to which the authentication device 18 can check the authorization. Said authentication device 18 can for this purpose, for example, comprise an encoding device 21 that can, for example, comprise a hash module, as initially already named.

If the querying party is authorized, the server 6 transmits the second, reduced data set 8, that is intended to represent a 3D model for he workpiece 2 marked by the workpiece ID 16, to the end device 12, with this data transmission 22 likewise being able to take place wirelessly via wireless LAN or an intranet of the production facility.

The end device 12 can effect a representation of the 3D model of the workpiece 2 on a display unit that can be connected to the end device 12 using the transmitted model data, i.e. the second data set 8. It can be the already named display apparatus 11 at the production station 1. The end device 12 can, however, also advantageously comprise a tablet computer 23 having a touchscreen on which the 3D model of the workpiece can be represented. The visualization module of the end device 12 that can be implemented in the form of a software module, for example, at said tablet computer 23 can advantageously permit a rotation and flipping of the 3D model on the display apparatus, with said touchscreen of the tablet 23 advantageously being able to allow the control.

Alternatively or additionally to such a tablet 23, the end device 12 can, however, also comprise data glasses 34 that the machine operator 25 wears on his head and that show the display of the workpiece model in the glasses to display the workpiece model to the machine operator 25 in the sense of augmented reality.

As FIGS. 1 and 2 show, the previously explained reading in of the code 10 can take place in different manners. The tablet computer 23 and/or the data glasses 24 can, for example, comprise the previously named read-in apparatus 13 of the end device 12 to, for example, be able to read the code 10 displayed on the display apparatus 11, cf. FIG. 1, or the code 10 directly affixed to the workpiece 2.

The invention claimed is:

1. A method of providing a workpiece representation at a production station, said method comprising:
   storing a first data set for representing an original model of the workpiece in a database;
   generating a second data set simplified with respect to the first data set for representing a simplified model of the workpiece and storing the second data set in the database or another database;
   providing a code for identifying the workpiece to be produced at the production station;
   retrieving the second data set from the database by an end device using the code entered or read at the end device; and
   displaying the simplified model of the workpiece on a display apparatus connected to the end device with reference to the retrieved second data set transmitted to the end device.

2. The method in accordance with claim 1, wherein the code is decoded at the end device by a decoding device and a model identification is generated from the code, with said model identification being transmitted from the end device to the database or to a server connected to the database for querying the workpiece model.

3. The method in accordance with claim 2, wherein a database identification is generated in addition to the model identification from the code by the decoding device, with the database to which the query is directed, being selected by the end device with reference to said database identification.

4. The method in accordance with claim 2, wherein the decoded model identification is transmitted together with an end device or user identification to the database or to the server connected thereto, with the authorization of the querying end device or of the user using the end device for the querying of the model data being checked by an authentication device using the transmitted model identification and the transmitted end device or user identification and with the model data being transmitted or not transmitted by the database or the server connected thereto in dependence on the authorization check.

5. The method in accordance with claim 1, wherein a QR code is prepared as the code, is transmitted to the production station, and is provided in a readable manner there.

6. The method in accordance with claim 1, wherein the second, simplified data set is stored in the same database as the first data set and is saved as an attachment to or as a part of the first data set.

7. The method in accordance with claim 1, wherein the code is stored in the database together with the second, simplified data set.

8. The method in accordance with claim 1, wherein the simplified model of the workpiece is displayed on the display apparatus of the end device in the form of a 3D model, with the perspective of the display being able to be flipped or rotated.

9. The method in accordance with claim 1, wherein the simplified model of the workpiece is displayed on a mobile end device, in particular in the form of a tablet computer or data glasses.

10. An apparatus for providing a workpiece representation at a production station, the apparatus comprising:
a database configured to store a first data set for representing an original model of the workpiece;
a data set generator configured to generate a second data set simplified with respect to the first data set for representing a simplified model of the workpiece and storing the second data set in the database or another database;
a code generator configured to generate a code for identifying the workpiece to be produced at the production station, wherein an end device having a display apparatus for displaying the simplified model of the workpiece comprises an input apparatus for entering or reading said code;
a retrieval device configured to fully automatic automatically or semi-automatically retrieve the second data set from the database using the entered or read code; and
a visualization device configured to display the simplified model of the workpiece with reference to the retrieved and transmitted second data set on the display apparatus.

11. The apparatus in accordance with claim 10, wherein the end device has a decoding device for decoding the code and for generating a digital model identification from the code, with the retrieval device of the end device being configured to automatically transmit said model identification to the database or to a server connected to the database to query the workpiece model.

12. The apparatus in accordance with claim 11, wherein the decoding device is further configured to generate a database identification from the code in addition to the model identification; and wherein the retrieval device of the end device is configured to automatically select the database to which the query is directed using said database identification.

13. The apparatus in accordance with claim 11, wherein the end device is configured to transmit the decoded model identification together with an end device or user identification to the database or to the server connected thereto, with an authentication device being configured to check the authorization of the querying end device or of the user using the end device for the querying of the model data by using the transmitted model identification and the transmitted end device or user identification and to transmit or not transmit the model data from the database or the server connected thereto in dependence on the authorization check.

14. The apparatus in accordance with claim 10, wherein the code generator is configured to prepare a QR code as the code, to transmit it to the production station, and to provide it in a readable manner there.

15. The apparatus in accordance with claim 10, wherein the second, simplified data set is stored in the same database as the first data set and is saved as an attachment to or as a part of the first data set.

16. The apparatus in accordance with claim 10, wherein the code is stored in the database together with the second, simplified data set.

17. The apparatus in accordance with claim 10, wherein the visualization device of the end device is configured to display the simplified model of the workpiece on the display apparatus of the end device in the form of a 3D model whose perspective can be flipped or rotated.

18. The apparatus in accordance with claim 17, wherein the display device is configured as a touchscreen and allows a rotation or flipping of the workpiece representation by touching the touchscreen.

19. The apparatus in accordance with claim 10, wherein the end device is configured as mobile, in particular in the form of a tablet computer.

20. The apparatus in accordance with claim 10, wherein the end device comprises data glasses for displaying the simplified data model in the sense of augmented reality.

21. The apparatus in accordance with claim 20, wherein the data glasses include a code reader for reading the code.

22. The apparatus in accordance with claim 10, wherein the retrieval device, the decoding device, and the visualization device of the end device are each implemented in the end device in the form of a software module.

* * * * *